Patented May 27, 1941

2,243,324

UNITED STATES PATENT OFFICE 2,243,324

SUBSTITUTED PYRAZOLONES

James Horace Williams, Riverside, Conn., assignor to American Cyanamid Company, New York, N. Y., a corporation of Maine No Drawing. Application February 15, 1940, Serial No. 319,081

8 Claims. (Cl. 260—310)

The present invention relates to a new class of chemical compounds, namely p-arylene sulfon-pyrazolones. More particularly it relates to the class of compounds which may be represented by the following general formula:

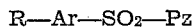

wherein R represents an amino, alkylamino, acylamino, monoaldose amino, sodium formaldehyde sulfoxylate amino or nitro group, Ar stands for p-arylene or p-arylene sulfonamido p-arylene and Pz represents a pyrazolone or substituted pyrazolone group.

The preferred compounds of the present invention are those most probably represented by the following formula:

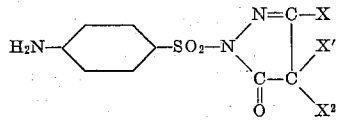

in which X, X', and $X^2$ may either be hydrogen, alkyl or phenyl or combinations of such groups. The pyrazolone group may also be those represented by the following formula:

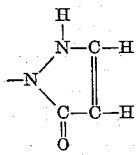

or substituted derivatives thereof including compounds such as 4,5-dimethyl-2-pyrazolone, and 3-dimethylamino-4,5-dimethyl-2-pyrazolone.

The new compounds of this invention are valuable intermediate substances in the manufacture of wetting agents, azo dyestuffs and pharmaceuticals.

While the present invention is not limited to any particular process of preparing the new compounds a preferred method comprises reacting a p-nitroarylene sulfonyl chloride with a pyrazolone in a suitable inert organic solvent, such as pyridine, dioxane and the like at a slightly elevated temperature, and crystallizing the reaction product from boiling water.

The corresponding amino compounds can either be prepared by reducing the nitro compounds, or by reacting p-acetyl amino arylene sulfonyl chloride with a pyrazolone in an organic solvent such as pyridine, dioxane and the like, and hydrolyzing to remove the acetyl group.

The substituted amino compounds such as alkylamino-benzene sulfon-pyrazolones, acylamino, mono-aldose amino, and sodium formaldehyde sulfoxylate amino and the like may be prepared by the usual methods of preparing substituted amines. For example, the sodium formaldehyde sulfoxylate derivatives of the amino compounds may be prepared by reacting the appropriate amino derivative with a slight excess of sodium formaldehyde sulfoxylate in glacial acetic acid and precipitating the dry product with glacial acetic acid, or the aldohexose derivatives may be prepared in most cases by refluxing an alcoholic solution of the appropriate sugar such as glucose with the amino compound until a solution results and cooling to precipitate the glucose derivative. The p-amino arylene sulfonamido p-arylene sulfon-pyrazolones can be prepared by reacting a p-amino arylene sulfon-pyrazolone with a p-acetyl amino arylene sulfonyl chloride in an organic solvent such as pyridine or dioxane, and then hydrolyzing to remove the acetyl group, or by reacting with nitro arylene sulfonyl chloride to produce the p-nitro arylene sulfonamido p-arylene sulfon-pyrazolones. The invention is further illustrated by the following examples, without being restricted thereto.

The parts are expressed by weight in the following examples except in the case of liquids which are corresponding parts by volume.

Example 1

Preparation of

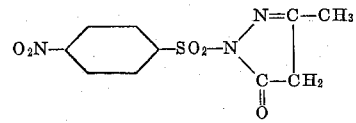

14 parts of methyl pyrazolone were added to 30 parts of dry pyridine and 32 parts of p-nitrobenzene sulfonyl chloride were slowly added thereto, with agitation. When the addition was complete the reaction mixture was heated on a steam bath for about two hours. At the end of this time the reaction mixture was poured into water and the oil which separated allowed to crystallize. The precipitate was filtered off and crystallized from boiling water. The product melted at about 132° C.

Analysis: C calc. 42.4 % found 42.53, 42.46%
H calc. 3.18% found 3.22, 3.29%
N calc. 14.83% found 14.51, 14.74%

Example 2

Preparation of

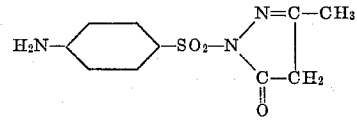

75 parts of reduced iron dust were allowed to react with 75 parts of 5% acetic acid. When the initial reaction had subsided 34 parts of the nitro compound prepared in accordance with Example 1 were added thereto slowly. The resulting mixture was heated on a steam bath for about two hours. At the end of this time the mass was diluted with about 100 parts of water and made slightly alkaline by addition thereto of sodium carbonate. The alkaline mixture was then heated in a steam bath with stirring, and filtered. The filtrate on cooling deposited the product in the form of needles. When crystallized from a mixture of alcohol and water the product melted at 167–8° C.

Analysis: C calc. 47.42%   found 47.48, 47.58%
H calc. 4.35%   found 4.42, 4.34%
N calc. 16.60%   found 16.75, 16.59%

What I claim is:

1. The compounds represented by the following general formula:

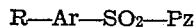
R—Ar—SO$_2$—Pz in which R represents a member of the group consisting of nitro, amino, alkylamino, acylamino, mono-aldose-amino and sodium formaldehyde sulfoxylate amino groups, Ar represents a member of the group consisting of p-phenylene and p-phenylene sulfonamido p-phenylene and Pz represents a pyrazolone group which contains no primary or secondary extra-cyclic nitrogen atoms and which is directly linked to the sulfonyl group through a cyclic nitrogen atom.

2. Compounds having the following general formula:

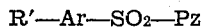
R'—Ar—SO$_2$—Pz in which R' represents a member of the group consisting of amino and nitro groups, Ar represents a member of the group consisting of p-phenylene and p-phenylene sulfonamido p-phenylene and Pz represents a pyrazolone group which contains no primary or secondary extra-cyclic nitrogen atoms and which is directly linked to the sulfonyl group through a cyclic nitrogen atom.

3. Compounds having the following general formula:

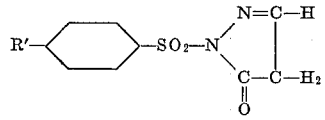

in which R' is a member of the group consisting of amino and nitro groups.

4. Compounds having the following general formula:

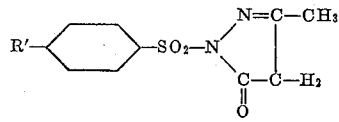

in which R' is a member of the group consisting of amino and nitro groups.

5. Compounds having the formula:

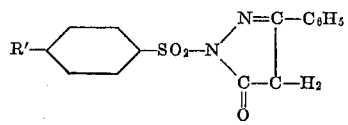

in which R' is a member of the group consisting of amino and nitro groups.

6. A process of preparing a p-phenylene sulfon-pyrazolone having the following general formula:

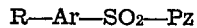
R—Ar—SO$_2$—Pz in which R represents a member of the group consisting of nitro, amino, alkylamino, acylamino, mono-aldose-amino and sodium formaldehyde sulfoxylate amino groups which is in para position to the sulfonyl group, Ar represents a member of the group consisting of p-phenylene and p-phenylene sulfonamido p-phenylene, and Pz represents a pyrazolone group which contains no primary or secondary extra-cyclic nitrogen atoms and which is directly linked to the sulfonyl group through a cyclic nitrogen atom, which comprises reacting in an organic solvent a p-phenylene sulfonyl chloride having the formula

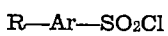
R—Ar—SO$_2$Cl in which R and Ar are defined as above, with a pyrazolone containing a reactive hydrogen attached to a cyclic nitrogen atom and having no extra-cyclic primary or secondary amino groups, and separating the reaction product.

7. The process which comprises reacting p-nitrobenzene sulfonyl chloride with a pyrazolone containing a reactive hydrogen attached to a cyclic nitrogen atom and having no extra-cyclic primary or secondary amino groups in the presence of pyridine, and separating the reaction product.

8. A process of preparing a p-aminobenzene sulfon-pyrazolone which comprises reducing the nitro compound produced by the process of claim 7.

JAMES HORACE WILLIAMS.